No. 699,475. Patented May 6, 1902.
B. E. BECHTEL.
BRICK PLANT.
(Application filed Nov. 29, 1901.)
(No Model.) 2 Sheets—Sheet 1.
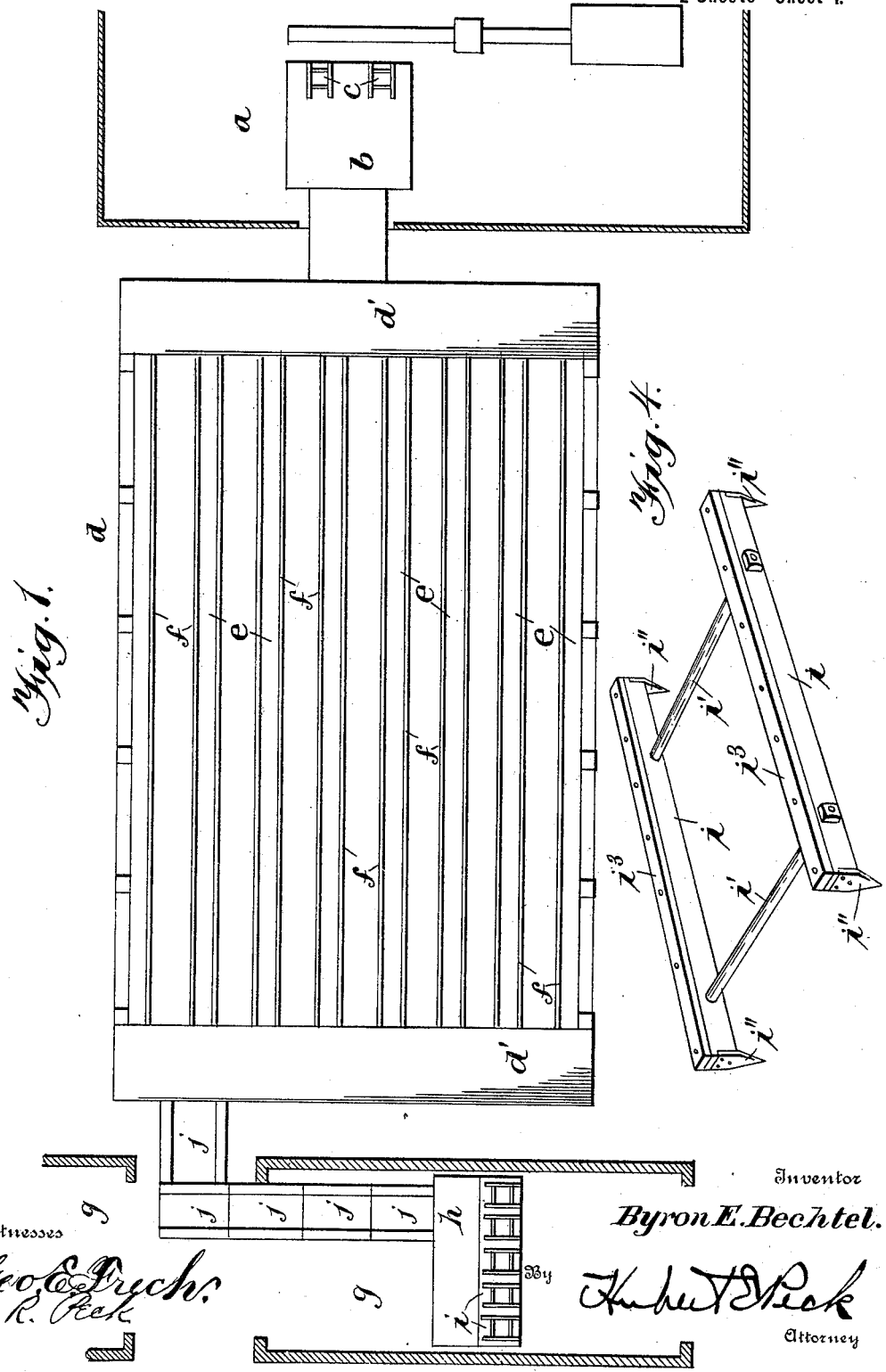
Witnesses
Geo. E. Drych.
E. R. Peck
Inventor
Byron E. Bechtel.
By Hubert Peck
Attorney No. 699,475. Patented May 6, 1902.
B. E. BECHTEL.
BRICK PLANT.
(Application filed Nov. 29, 1901.)
(No Model.) 2 Sheets—Sheet 2.
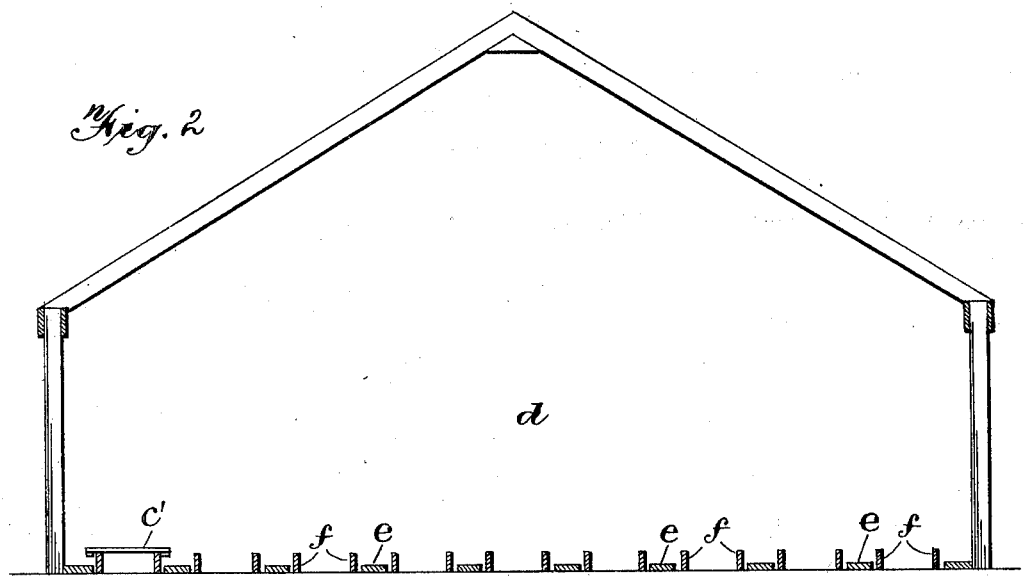
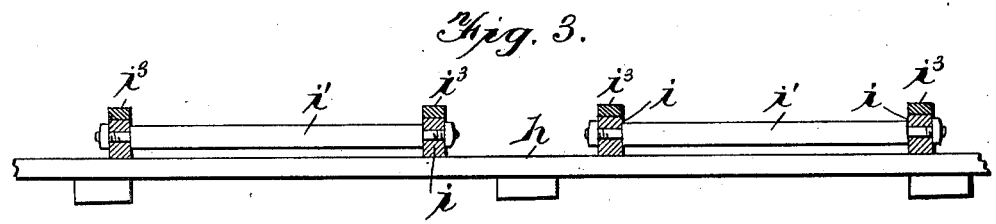
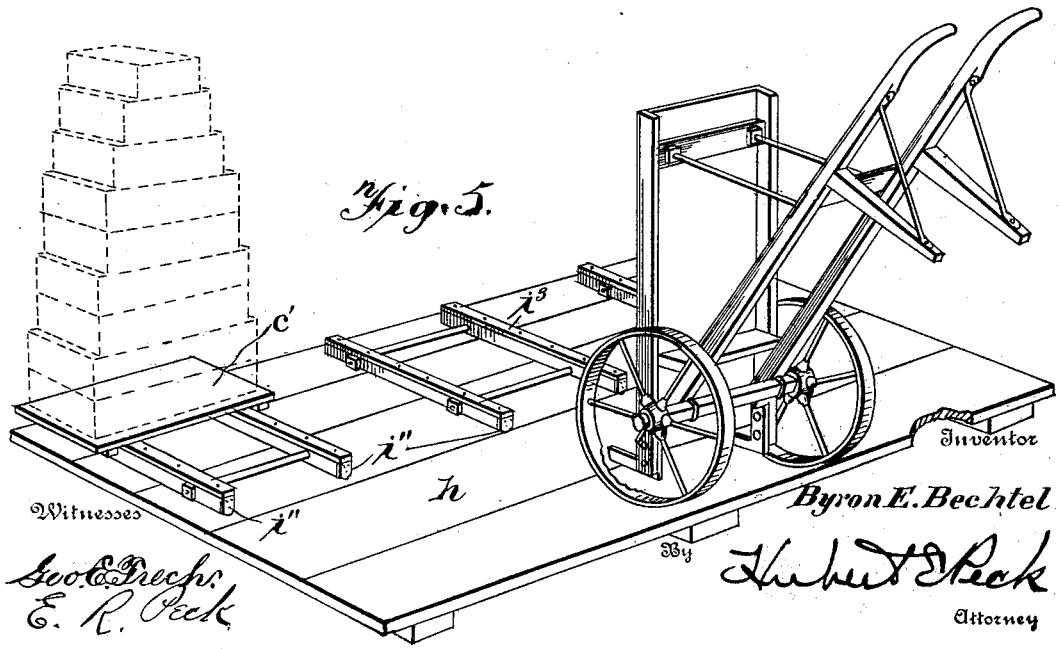
Witnesses
Geo. E. Prech.
E. R. Peck
Inventor
Byron E. Bechtel
By Hubert Peck
Attorney
THE NORRIS PETERS CO., PHOTO-LITHO., WASHINGTON, D. C.

UNITED STATES PATENT OFFICE.

BYRON ERB BECHTEL, OF WATERLOO, CANADA.

BRICK PLANT.

SPECIFICATION forming part of Letters Patent No. 699,475, dated May 6, 1902.

Application filed November 29, 1901. Serial No. 84,074. (No model.)

*To all whom it may concern:*

Be it known that I, BYRON ERB BECHTEL, a subject of the King of Great Britain, residing at Waterloo, Province of Ontario, Dominion of Canada, have invented certain new and useful Improvements in Brick Plants; and I do hereby declare the following to be a full, clear, and exact description of the invention, such as will enable others skilled in the art to which it appertains to make and use the same.

This invention relates to certain improvements in brick plants; and the objects and nature of the invention will be obvious to those skilled in the art in the light of the following explanations of the accompanying drawings, which disclose, merely as examples for the purposes of illustration, specific constructions and arrangements within the spirit and scope of my invention.

My invention consists in certain novel features in construction and in combinations and in arrangements of parts, as more fully and particularly pointed out and specified hereinafter.

Referring to the accompanying drawings, Figure 1 is a ground plan or a diagrammatical view of a brick plant arranged in accordance with my invention. Fig. 2 is an end view of a hack-shed, showing the arrangement of tracks and elevated supports for the brick-trucks and pallets of green bricks. Fig. 3 is a perspective view of part of an unloading-platform, showing several of the tables or supports thereon. Fig. 4 is a detail perspective view of one of the pallet receiving or delivering tables or supports. Fig. 5 is a detail perspective view of a truck which can be employed in connection with the tracks and supports shown for conveying the green bricks.

This invention relates more particularly to improvements in the system of or a plant for the manufacture of bricks from what is termed "stiff mud," or according to the stiff-mud system.

In the drawings, the diagram $a$ indicates the location of the green-brick-forming machinery. $b$ is a comparatively large platform arranged at the discharge from the brick-forming machinery or closely adjacent thereto, preferably so that the bricks as discharged from the machine can be piled or stacked, as hereinafter described, on said platform. I preferably provide said loading-platform with one or more tables or supports to uphold the pallets on which the green bricks from the machine or machines can be stacked. Each loading-table preferably consists of two parallel bars, beams, or pieces of scantling $c$, resting and secured on said platform and arranged on edge. For instance, said beams might be each about thirty inches long and three or four inches high, more or less. The two beams are rigidly secured together and are spaced a suitable distance apart—say about twenty inches apart. If more than one table or support is employed, said supports are usually arranged parallel with each other at the edge of the platform next to the brick-machine and transversely of or at right angles to said edge. Usually the operators stand between the brick-forming machinery and said supports on the platform, so that they can take the bricks directly from the machinery and stack them on the flat boards or pallets $c'$, resting horizontally and transversely on said supports or tables and upheld thereby—say about three or four inches, more or less, above the surface of the platform.

$d$ indicates the location of the hack or drying shed. The loading-platform $b$ is preferably arranged at one end of said shed. Usually I arrange plank walks $d'$ or other suitable floors transversely at the opposite ends of the shed and connect the loading-platform with the floor at the inlet end of the shed by a suitable floor or arrange said platform with one edge close to said floor, so that the trucks can easily pass back and forth from floor to platform. Within the drying-shed and extending approximately from the inlet end to the outlet end thereof I longitudinally arrange a series of straight parallel tracks $e$. Each track usually consists of a flat plank or board or a number of planks in continuation of each other laid flat down on the floor of the shed. These tracks are preferably equally spaced from one side of the shed to the other. The tracks are spaced according to the distance between the wheels of each truck and the length of the brick-pallets. In the longitudinal spaces between said tracks I longitudinally arrange elevated supports $f$. Each support usually consists of beams or scantlings arranged end to end and placed on edge, so that the top edges thereof are in planes a distance above the planes of the tracks e. For instance, each elevated support might be three or four inches high and two inches wide, more or less. These elevated supports are arranged parallel with the tracks and in pairs in said spaces between the tracks. The elevated supports of each pair are preferably arranged the same distance apart—say about twenty inches, more or less.

g g indicate kilns arranged adjacently to the outlet end of the hack or drying shed.

h is a movable unloading-platform adapted to rest horizontally on the floor of a kiln to be filled with brick for burning and capable of being moved along the floor of the kiln as the same is filled with the brick delivered onto the platform from the hack or drying shed. This movable unloading-platform is provided with one or more elevated unloading tables or supports on which the pallets of bricks can be deposited from the trucks. These tables are preferably arranged transversely at the discharge edge of the unloading-platform, and each consists of two parallel bars $i\ i$, arranged on edge to support the pallets of bricks a distance above the top surface of the platform. The two bars can be rigidly secured together, as by cross bolts or bars $i'\ i'$, and each can be provided with one or more rigid depending spikes or sharp metal projections $i''$ to enter the platform and hold the table fixedly thereto while the pallets of bricks are being delivered thereon from the truck or trucks. I also preferably cushion the upper or pallet-receiving edges of said unloading-supports for the purpose of reducing to a minimum danger of chipping or damaging the bricks when jarred or jolted during the delivering of the bricks by the trucks onto the supports. As an example of a cushioning device which might be employed I show hard-rubber strips $i^3$ secured on the top edges of the edgewise-arranged bars $i$. Where each said bar is, say, thirty inches long, two inches wide, and three inches high, I usually employ rubber strips of the same width and length and about one inch (more or less) thick.

j represents movable sectional truck-tracks from the floor at the outlet or discharge end of the hack or drying shed or tunnel to the edge of the unloading-platform opposite the discharging edge of said platform, at which edge the said elevated unloading-supports are arranged. These track-sections are so arranged that the operators can easily move and shift them to maintain the proper passage-way or trackway for the trucks from the drying-shed to the unloading-platform as said platform is periodically shifted during the process of filling a kiln or when the unloading-platform is shifted from kiln to kiln.

The construction and arrangements of the parts of the plant described are such that peculiarly-constructed brick-trucks can easily and without injury to the bricks pick up the loaded pallets from the loading tables or supports on the loading-platform and carry the same directly into the drying-shed and deposit the loaded pallets on the elevated supports in said shed. The tracks run through the shed, so that trucks can pick up the loaded pallets and convey them from the outlet end of the shed and deposit the same on the cushioned elevated unloading-supports on the unloading-platform in the kiln being filled for burning.

The truck employed preferably has a platform inclined upwardly and rearwardly from and secured to the front ends of the handle-bars and depending below the same. The lower end of the platform is provided with forwardly-extending supporting fingers or brackets arranged about at right angles to the plane of the platform. The truck-axle is secured to the handle-bars, and the supporting-wheels are mounted on the axle ends at the outer sides of the handle-bars and platform. The arrangement and construction of the truck is such that the operator by raising the handles can lower said brackets or fingers to a horizontal position, so that the truck can be moved up to a loaded pallet, and the fingers will pass under the pallet and beside the two edgewise-arranged bars upholding the pallet from the platform or floor. The operator then depresses the truck-handles, thereby causing the fingers to move up (in an arc having the elevated wheel-axle as a center) and pick up the loaded pallet, allowing the bricks stacked thereon to rest easily against the platform of the truck.

The loading and unloading platforms described usually have the elevated tables or supports located near an edge of each, so as to leave a clear space on the platform in rear of said tables on which the trucks can be turned and manipulated.

The tracks and elevated supports in the hack-shed are closely arranged, so that approximately across the full width of said shed one truck-wheel track is arranged between each pair of supports. Hence a separate pair of tracks is not required for each pair of elevated supports, and the pairs of supports can be arranged approximately close together, allowing room enough only for the passage of a loaded truck over one pair of supports between loaded pairs of supports on both sides thereof. The floor constituting a track or the track or wheel space between each pair of pallet-supports of the hack-shed serves for one wheel of a truck delivering to or taking from the pair of said supports on one side of said track and also serves for a wheel of a truck delivering to or taking from the pair of said supports on the opposite side of said track, thereby enabling the parallel pairs of supports to be closely arranged and dispensing with an extra track-rail between each pair of supports.

The pallets loaded with green brick on the elevated loading-tables are picked up by the trucks, and the trucks are run in on the hack-shed tracks, and the pallets are deposited closely together on the elevated supports.

The passage-ways, floors, or tracks for the trucks in effect extend from the loading-table completely through the hack-shed to the unloading-table.

The green bricks are handed from the forming machinery directly to and are hacked or stacked on the pallets at the elevated loading-tables, and it is not necessary to disturb the bricks on the pallets until they are removed therefrom at the elevated unloading-tables and placed in the kilns for burning. The loaded pallets are passed by the trucks from the loading to unloading tables and through the hack-sheds.

The trucks run on the tracks into the outlet end of the hack-shed and pick up the pallets bearing the dried bricks and convey the same to the elevated unloading-tables and deposit the same thereon, as previously described.

The system described comprises the elevated supports for the pallets and tracks or floors for the truck-wheels, so that the trucks can readily pick up and deposit the heavily-loaded pallets without injury to the bricks thereon.

I do not wish to limit my invention strictly to the arrangements of tracks, floors, or supports shown nor to the wooden tracks, floors, and elevated supports, as these parts can be otherwise formed and arranged and other forms of floors for the truck-wheels might be employed and other forms of elevated supports for the loaded pallets might be provided to enable the trucks to easily deposit the loaded pallets thereon and pick the same up therefrom. It is also evident that various changes and modifications might be resorted to in the forms, arrangements, and constructions of the parts described without departing from the spirit and scope of my invention.

What I claim is—

1. A brick plant having a loading-platform provided with elevated supports adapted to uphold the pallets on which the green bricks are stacked, whereby the loaded pallets can be picked up by the brick-truck, a hack-shed having parallel elevated supports for the loaded brick-pallets, extending therethrough, an unloading-platform provided with elevated supports to receive and uphold the loaded brick-pallets from said shed, and passage-ways or floors for the brick-trucks from the loading-platform to and through the shed to said unloading-platform, substantially as described.

2. A brick-making plant or system having brick-pallets, a loading-platform arranged adjacent to the green-brick-forming machinery, and provided at its brick-receiving edge with a fixed elevated support for the loaded brick-pallets comprising two parallel rigid bars or beams resting on the platform, a hack-shed having elevated supports therein to receive the loaded pallets, and a passage-way for the trucks from said platform into said shed, substantially as described.

3. A brick plant having a hack-shed having an inlet and an outlet, and a multiplicity of pallet-supporting beams arranged edgewise along the floor of said shed between said inlet and outlet, said beams arranged in parallel pairs, said pairs being closely arranged transversely with intervening track-spaces between and parallel with said pairs of beams for the passage of the wheels of a hand-truck movable along above any pair of beams with its wheels in the track-spaces along opposite sides of said pair, transverse truck-passages at the inlet and outlet of said shed communicating with said track-spaces, whereby the loaded trucks can pass in at the inlet along any pair or pairs of beams to deposit the loaded pallets on said beams, and whereby trucks can pass in at the outlet along any pair or pairs of beams to pick up and remove the loaded pallets from the shed, substantially as described.

4. A brick-making plant having a hack-shed having elevated supports extending therethrough from the inlet to the outlet thereof, and tracks arranged between and parallel with the supports, the supports and tracks arranged so that each track serves for two supports, substantially as described, and transverse truck-passages arranged at the ends of said tracks and supports and communicating with each track, whereby loaded trucks can move through the inlet and along any track and support, and whereby trucks for removing the bricks can move in and out of the outlet and along any track and support.

5. A brick-making plant having a hack-shed having series of elongated parallel supporting-bars closely arranged on and projected above the floor thereof and adapted to transversely receive loaded brick-pallets and uphold the same from said floor, said bars arranged in parallel pairs with spaces between the pairs for the passage of the truck-wheels, whereby the trucks can pass in and out at one end of the shed in depositing the loaded pallets on said bars, and can pass in and out at another end of the shed in picking up and removing said loaded pallets, substantially as described.

6. A brick-making plant having a hack-shed having closely-arranged series of supporting-bars extending therethrough between the inlet and outlet thereof, said bars arranged in pairs for the purpose specified, and a parallel truck-wheel track arranged between each pair of said bars, as and for the purposes mentioned.

7. A brick-making plant having a hack-shed having series of pairs of supporting-bars arranged on and projecting above the floor thereof to receive and uphold the loaded pallets of brick, said bars arranged with intervening spaces for the truck-wheels, a movable unloading-platform arranged in a kiln and provided with an elevated unloading-table to receive the loaded pallets from the trucks, and a passage-way for the trucks from said supporting-bars of said shed to said platform comprising movable track-sections, substantially as described.

8. A brick plant having a platform to receive the loaded brick-trucks, and parallel bars resting on and projecting above the platform and rigidly secured together and provided at their top edges with cushioning-strips, substantially as described.

9. In a brick plant, a platform to receive the brick-trucks, and an elevated support on the platform comprising bars resting on the platform and rigidly secured together and provided with projections to enter the platform and hold the support in place, said support adapted to transversely receive loaded brick-pallets from a truck and uphold the same from the platform, as described.

10. In a brick plant, a hack-shed having a multiplicity of closely-arranged parallel pallet-supporting beams arranged on the floor thereof, said beams arranged in pairs with track-wheel spaces between the pairs and parallel therewith and a single track arranged in each space parallel with the beams, as and for the purpose stated, the arrangement being such that a hand-truck can move longitudinally along above a pair of beams with its wheels traveling on the tracks outside of said pairs, substantially as described.

In testimony whereof I affix my signature in presence of two witnesses.

BYRON ERB BECHTEL.

Witnesses:
CHAS. O'DONNELL,
B. W. BROWN.